(12) United States Patent
Kaneda et al.

(10) Patent No.: US 7,048,221 B2
(45) Date of Patent: May 23, 2006

(54) DOOR MEMBER FOR TAPE CARTRIDGE, AND TAPE CARTRIDGE

(75) Inventors: Hiroshi Kaneda, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 10 days.

(21) Appl. No.: 10/806,181

(22) Filed: Mar. 23, 2004

(65) Prior Publication Data

US 2004/0195414 A1    Oct. 7, 2004

(30) Foreign Application Priority Data

Mar. 27, 2003   (JP) .............................. 2003-086709

(51) Int. Cl.
  *G11B 23/107* (2006.01)
(52) U.S. Cl. .................................. 242/348.2
(58) Field of Classification Search ................ 242/348, 242/348.2, 347, 347.1, 326.2, 326, 326.1; 360/95, 93, 132, 133; 369/292
See application file for complete search history.

(56) References Cited

U.S. PATENT DOCUMENTS

| | | | | | |
|---|---|---|---|---|---|
| 4,045,821 A | * | 8/1977 | Fujikura | ..................... | 360/132 |
| 4,559,575 A | * | 12/1985 | Noto et al. | ................. | 360/132 |
| 5,257,153 A | * | 10/1993 | Sakurada | .................... | 360/133 |
| 6,349,892 B1 | * | 2/2002 | Morita et al. | ............ | 242/347.1 |
| 6,672,528 B1 | * | 1/2004 | Morita et al. | ................ | 242/348 |
| 6,702,216 B1 | * | 3/2004 | Shima et al. | ............ | 242/348.2 |
| 6,712,303 B1 | * | 3/2004 | Ishihara et al. | .......... | 242/348.2 |
| 6,843,440 B1 | * | 1/2005 | Satoh et al. | ............. | 242/348.2 |
| 2002/0170998 A1 | | 11/2002 | Shima et al. | | |
| 2004/0190182 A1 | * | 9/2004 | Kitamura et al. | | |

FOREIGN PATENT DOCUMENTS

JP          2002-100148         4/2002

* cited by examiner

*Primary Examiner*—William A. Rivera
(74) *Attorney, Agent, or Firm*—Greenblum & Bernstein, P.L.C.

(57) ABSTRACT

A door member for a tape cartridge capable of automating the operation of mounting a spring member thereon. A door body is in the form of a flat plate. A spring-mounting portion is in the form of a flat plate and extends from the door body and has one end face in which opens an insertion hole formed therein for having a foremost end of a spring member inserted therein. One surface-side wall and another surface-side wall define the insertion hole from an opening-side region of the insertion hole toward the end face to an innermost region of the insertion hole. Cutouts are alternately formed in the one surface-side wall and the other surface-side wall, such that the cutouts communicate with the insertion hole. A protuberance is formed on an inner surface of the one surface-side wall facing the innermost region, for engagement with the foremost end of the spring member.

13 Claims, 5 Drawing Sheets

DOOR MEMBER FOR TAPE CARTRIDGE, AND TAPE CARTRIDGE

BACKGROUND OF THE INVENTION

1. Field of the Invention

The present invention relates to a door member for a tape cartridge having a tape outlet formed in a housing thereof for allowing a magnetic tape to be pulled out, the door member closing the tape outlet such that the tape outlet can be opened, and a tape cartridge including the door member.

2. Description of the Related Art

As this kind of door member, there has been conventionally proposed a door member for a tape cartridge in Japanese Laid-Open Patent Publication (Kokai) No. 2002-100148. This door member has a body, a projection to be operated by an apparatus, and a spring-mounting portion on which a spring member is mounted. When seen from the inside of the door member, the spring-mounting portion is one step lower as compared with the inner surface of the door member, so that a hood is formed on the upper side of the spring-mounting portion. A spring member-fixing portion having a rectangular parallelepiped shape is formed on the inner surface of the spring-mounting portion, and a mount hole extends through the spring member-fixing portion in the vertical direction. Further, the outer surface of the spring-mounting portion is formed with a rectangular hole, which is provided for shaping the mount hole when the door member is molded. The mount hole extends through the upper one of the side walls of the rectangular hole.

A bend portion formed at one end of the spring member is mounted in the spring-mounting portion of the door member thus constructed in a state inserted into the mount hole from the lower side thereof. In this case, even if a second arm portion of the spring member is deformed due to expansion or contraction thereof occurring in accordance with the sliding of the door member, the foremost end of the bend portion protruding from the mount hole is brought into abutment with the lower surface of the hood, which prevents the inner surface of the housing from being abraded by the foremost end of the spring member.

However, as a result of the study of this door member for a tape cartridge, the present inventors found the following points to be improved: In this door member, it is necessary to mount the spring member on the door member by inserting the bend portion, which is hook-shaped, formed at the one end of the spring member into the mount hole with the foremost end thereof forward. In doing this, it is required to twist or rotate the spring member, which makes it difficult to automate the operation of mounting the spring member on the door member. As a result, it is difficult to comply with the demand for further reduced manufacturing costs, and therefore, the door member should be improved in this respect.

SUMMARY OF THE INVENTION

The present invention has been made to solve the problems described above, and an object thereof is to provide a door member for a tape cartridge, which is capable of automating the operation of mounting a spring member thereon, and a tape cartridge which can be further reduced in manufacturing costs thereof.

To attain the above object, in a first aspect of the present invention, there is provided a door member for a tape cartridge, the door member closing a tape outlet formed in the tape cartridge such that the tape outlet can be opened, the door member comprising a door body in the form of a flat plate, and a spring-mounting portion in the form of a flat plate, the spring-mounting portion extending from the door body and having one end face in which opens an insertion hole formed therein for having a foremost end of a spring member inserted therein, one surface-side wall and another surface-side wall defining the insertion hole from an opening-side region of the insertion hole toward the end face to an innermost region of the insertion hole, cutouts being alternately formed in the one surface-side wall and the other surface-side wall, such that the cutouts communicate with the insertion hole, the spring-mounting portion having a protuberance formed on an inner surface of the one surface-side wall facing the innermost region, for engagement with the foremost end of the spring member.

Preferably, the cutouts are formed by cutting out a portion of the one surface-side wall facing an intermediate region of the insertion hole between the opening-side region toward the end face and the innermost region, such that the formed cutout communicates with the insertion hole, and cutting respective portions of the other surface-side wall facing the opening-side region and the innermost region of the insertion hole, such that the formed cutouts communicate with the insertion hole.

With the arrangement of the door member for a tape cartridge, according to the first aspect of the invention, the spring-mounting portion is configured such that cutouts are alternately formed in the one surface-side wall and the other surface-side wall that define the insertion hole from the opening-side region and the innermost region, such that the cutouts communicate with the insertion hole, preferably by cutting out the portion of the one surface-side wall facing the intermediate region of the insertion hole, such that the formed cutout communicates with the insertion hole, and cutting respective portions of the other surface-side wall facing the opening-side region and the innermost region of the insertion hole, such that the formed cutouts communicate with the insertion hole, and that a protuberance is formed on the inner surface of the one surface-side wall facing the innermost region, for engagement with the foremost end of the spring member. Therefore, when the foremost end of the spring member is inserted into the insertion hole for engagement with the protuberance, even if the protuberance applies the urging force to the foremost end, which is about to climb over the protuberance, in the direction of the cutout of the other surface-side wall, it is possible to reliably move the foremost end of the spring member into the innermost end of the insertion hole while preventing the foremost end from protruding from the cutout in the other surface-side wall since the foremost end can be supported (sandwiched) by the three points, i.e. the respective portions of the one-side surface wall facing the opening-side region and the innermost region of the insertion hole and the portion of the other surface-side wall facing the intermediate region of the insertion hole. Therefore, it is possible to automatically cause the foremost end of the spring member to be engaged with the protuberance, so that it is possible to automate the operation of mounting the spring member in the door member. As a consequence, it is possible to sufficiently reduce the manufacturing costs of tape cartridges.

Preferably, an inner wall surface of the insertion hole on the door body side and an inner wall surface opposed to the inner wall are formed such that a distance between the inner wall surfaces is reduced toward an innermost end of the insertion hole. With the arrangement of this preferred embodiment, it is possible to smoothly and reliably guide the foremost end of the spring member to the innermost region of the insertion hole where the protuberance is formed, along the inner wall surfaces. Therefore, only by inserting the foremost end of the spring member into the insertion hole, the foremost end can be reliably engaged with the protuberance. As a result, it is possible to automate the operation of mounting the spring member on the door member during manufacturing of a tape cartridge, while maintaining a high level of reliability of engagement of the foremost end of the spring member with the protuberance.

Preferably, the spring-mounting portion includes a restriction portion that prevents the foremost end of the spring member inserted into the insertion hole from protruding from the spring-mounting portion. More preferably, the restriction portion is a restriction wall with which the foremost end of the spring member is brought into abutment, whereby the foremost end of the spring member is prevented from protruding from the spring-mounting portion. With the arrangements of these preferred embodiments, even when the amount of insertion of the spring member is a little too large, it is possible to cause the foremost end to be engaged with the protuberance while reliably preventing the foremost end from protruding (coming off) from the spring-mounting portion. As a result, it is possible to simplify the control of motion of the spring member in automating the operation of mounting the spring member on the door member. Therefore, it is possible to sufficiently reduce the costs of automatic machines for manufacturing tape cartridges. As a result, the manufacturing costs of tape cartridges can be further reduced.

To attain the above object, in a second aspect of the present invention, there is provided a tape cartridge accommodating a single reel of a magnetic tape, comprising a casing body formed by an upper casing and a lower casing which can be fitted to each other, the casing body having a side wall formed with a tape outlet from which the magnetic tape can be pulled out, a door member attached to the casing body such that the door member is slidable along the side wall, the door member closing the tape outlet such that the tape outlet can be opened, the door member corresponding to any of the door members described hereinabove as the first aspect of the present invention, and a spring member urging the door member toward a closed position in which the tape outlet is closed.

With the arrangement of this tape cartridge, by using the door member described above, it is possible to automate the operation of mounting the spring member on the door member during manufacturing of a tape cartridge. Therefore, it is possible to sufficiently reduce manufacturing costs of tape cartridges.

It should be noted that the disclosure of the present specification relates to the subjects included in Japanese Patent Application No. 2003-086709 which was filed with Japanese Patent Office on Mar. 27, 2003, and all of the disclosures thereby are expressly incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The door member for a tape cartridge and the tape cartridge, according to the present invention, will now be described in detail with reference to the drawings showing a preferred embodiment thereof.

First, the construction of the tape cartridge 1 will be described with reference to drawings.

Figure 1:
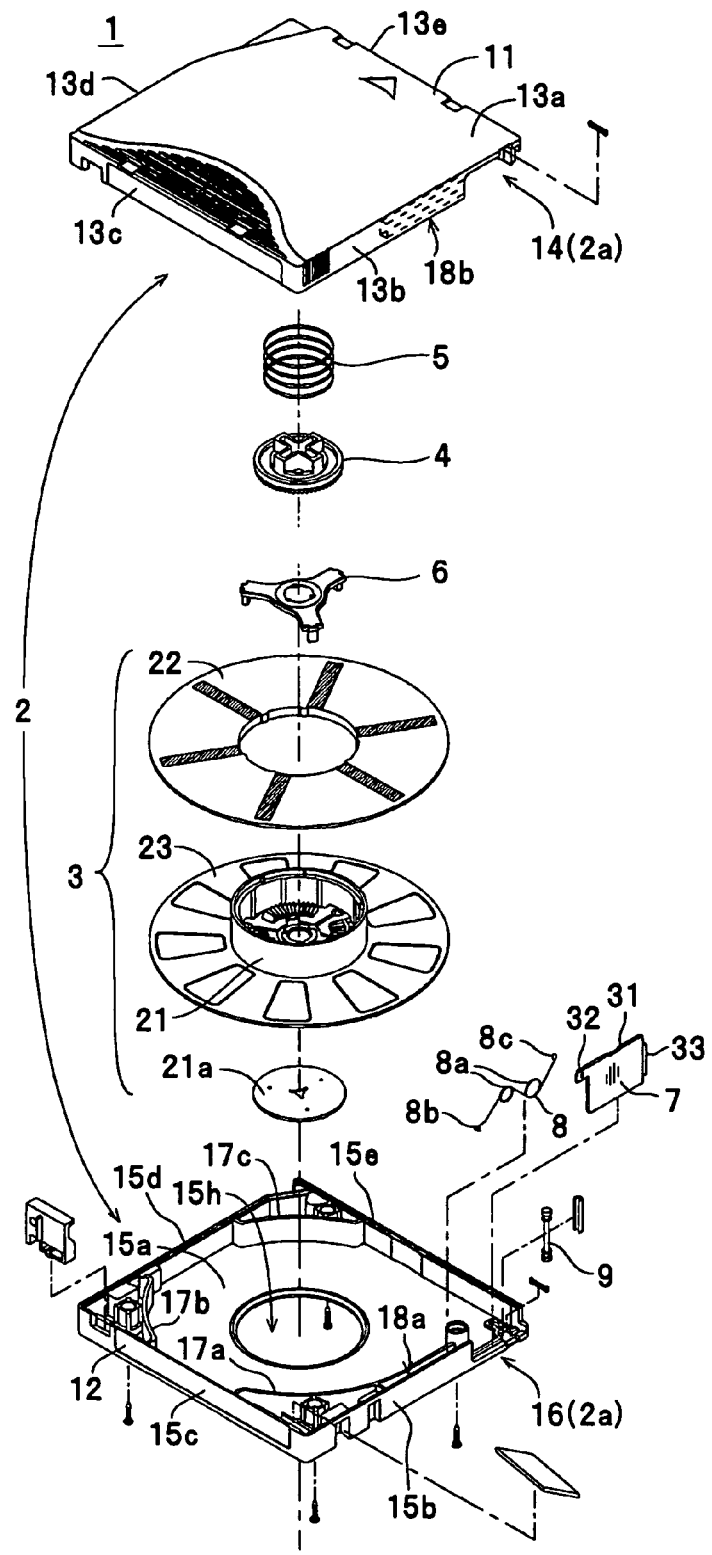
FIG. 1 is an exploded perspective view of a tape cartridge according to an embodiment of the present invention.

The tape cartridge 1 is a single-reel cartridge type recording medium which is used e.g. as a backup medium for preserving data recorded in a main recording medium for a computer, and as shown in FIG. 1, is comprised of a casing body 2, a tape reel 3, a lock member 4, a spring 5, a brake release plate 6, a door member 7, a spring member 8, and a pin member 9. It should be noted that a magnetic tape is wound around the tape reel 3 but the magnetic tape is not shown in the figures for clarity of the arrangement of the above component parts.

Referring to FIG. 1, the casing body 2 is comprised of an upper casing 11 and a lower casing 12 which are shallow plate-shaped and can be fitted with each other, and rotatably accommodates the tape reel 3 in an inner space formed when the casings 11 and 12 are fitted with each other. The upper casing 11 is comprised of a square top board 13a, four side boards 13b to 13e erected on the four sides of the top board 13a, arcuate partition walls, not shown, defining an accommodating section for accommodating the tape reel 3 within the casing body 2, all of which are integrally formed of resin as a one-piece member. The side board 13b of the upper casing 11 is formed with a cutout 14 forming a tape outlet 2a enabling the magnetic tape within the casing body 2 to be pulled out. Further, the upper casing 11 is formed, similarly to the lower casing 12, described hereinafter, with a guide groove 18b defined by the side board 13b and a partition wall, not shown, opposed to the side board 13b, for guiding the sliding of the door member 7 between a closed position in which the tape outlet 2a is closed, and an open position in which the tape outlet 2a is open. Further, four guide protrusions, not shown, are erected on a central portion of the inner surface of the top board 13a of the upper casing 11, for restricting the pivotal motion of the locking member 6 while allowing the vertical motion thereof.

As shown in FIG. 1, the lower casing 12 is comprised of a bottom board 15a, side boards 15b to 15e erected on the four sides of the bottom board 15a, and three partition walls 17a to 17c defining the accommodating section for accommodating the tape reel 3 in association with the partition walls formed on the upper casing 11, all of which are integrally formed of resin, as a one-piece member. The bottom board 15a is formed with a circular insertion hole 15h that enables insertion of a drive shaft, not shown, of a recording and reproducing apparatus. Further, the side board 15b is formed with a cutout 16 for defining the tape outlet 2a in association with the cutout 14 of the upper casing 11. Further, as shown in FIG. 1, a guide groove 18a is defined between the side board 15b and the partition wall 17a, for allowing the door member 7 to slide between the closed position and the open position.

As shown in FIG. 1, the tape reel 3 is comprised of a hub 21, an upper flange 22, and a lower flange 23. The hub 21 is formed into a bottomed cylindrical shape around which the magnetic tape can be wound, and is integrally formed with the lower flange 23 at a lower end thereof. Further, the hub 21 has teeth formed on an inner surface of a bottom board thereof, for meshing with the locking member 6, and a metal plate 21a mounted on an outer surface of the bottom board for allowing the drive shaft of the recording and reproducing apparatus to lock the tape reel 3. Further, the bottom board of the hub 21 is formed with three insertion holes for having the brake release plate 6 vertically movably mounted thereon. The hub 21 has teeth formed on the outer surface of the bottom board in a manner surrounding the metal plate 21a, for meshing with drive teeth of the drive shaft of the recording and reproducing apparatus. The upper flange 22 has a circular insertion hole formed through a central portion thereof, for having the lock member 4 and the brake release plate 6 inserted therethrough, and is welded to the upper end of the hub 21.

Figure 2:
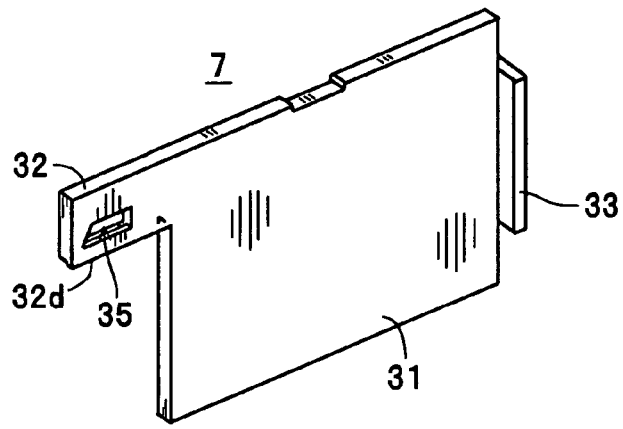
FIG. 2 is a perspective view of a door member.

The door member 7 is comprised of a door body 31, a spring-mounting portion 32, and an operating protrusion 33, as shown in FIGS. 1 and 2, and made by resin molding. The door body 31 is, as shown in FIG. 2, in the form of a flat plate having a rectangular parallelepiped shape and capable of closing the tape outlet 2a, and is mounted on the casing body 2 such that it can be slid along the side wall (side boards 13b and 15b) of the casing body 2. More specifically, the door member 7 is received in the very limited space formed by the guide groove 18b of the upper casing 11 and the guide groove 18a of the lower casing 12, together with the spring member 8. Further, by operating the operating protrusion 33 formed on an end face (right end face as viewed in FIG. 2) of the door body 31, the door member 7 is slid along the side walls 13b and 15b of the casing body 2 to open the tape outlet 2a.

Figure 3:
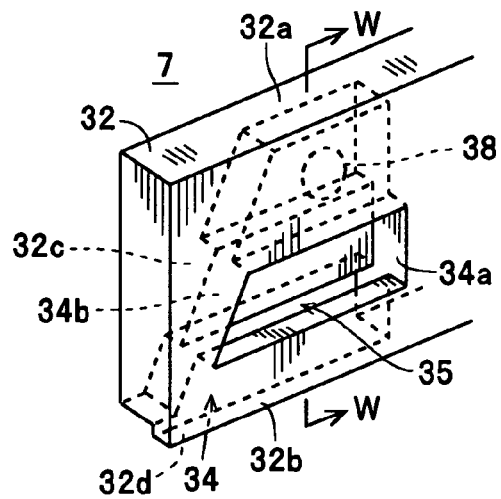
FIG. 3 is an enlarged fragmentary perspective view of a spring-mounting portion of the door member shown in FIG. 2.
Figure 4:
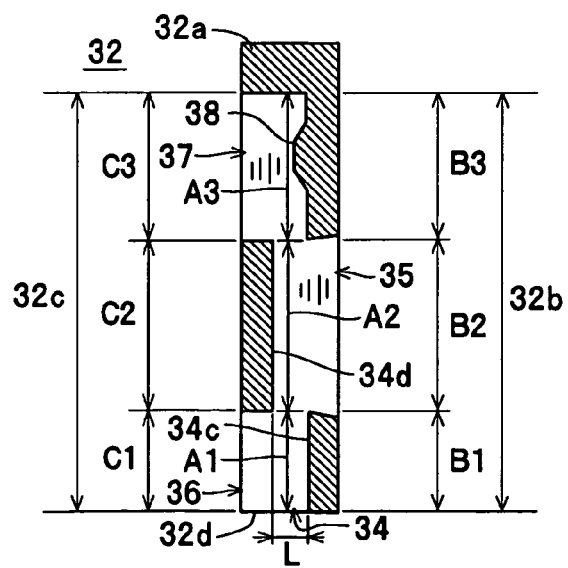
FIG. 4 is a sectional view taken on line W—W of FIG. 3.

On the other hand, the spring-mounting portion 32 is, as shown in FIG. 2, in the form of a flat plate (e.g. of a rectangular parallelepiped shape) having the same thickness as that of the door body 31, and extends from an upper portion of an end face (left end face as viewed in FIG. 2) of the door body 31. Further, the spring-mounting portion 32 is formed with an insertion hole 34 for having a foremost end 8c of the spring member 8 inserted therein, and the insertion hole 34 opens in a lower end face 32d of the spring-mounting portion 32. The insertion hole 34 is, as shown in FIG. 4, comprised of an opening-side region A1, an intermediate region A2, and an innermost region A3. Further, the insertion hole 34 is formed as a bottomed hole, so that the foremost end 8c of the spring member 8 inserted therein is brought into abutment with the bottom of the insertion hole 34, whereby the foremost end 8c end is prevented from protruding from the upper end of the spring-mounting portion 32. An upper wall 32a as one of the walls defining the insertion hole 34 serves as a restriction wall for preventing the foremost end of the spring member 8 from protruding out of the spring-mounting portion 32. Further, as shown in FIG. 3, an inner wall surface 34a on the side of the door body 31 is formed parallel with a direction perpendicular to the direction of sliding of the door member 7, and an inner wall surface 34b opposed to the inner wall surface 34a is formed as a sloped or inclined surface. Therefore, the insertion hole 34 is formed such that the distance between the inner wall surfaces 34a and 34b is progressively reduced toward the innermost end (toward the upper wall 32a).

Figure 5:
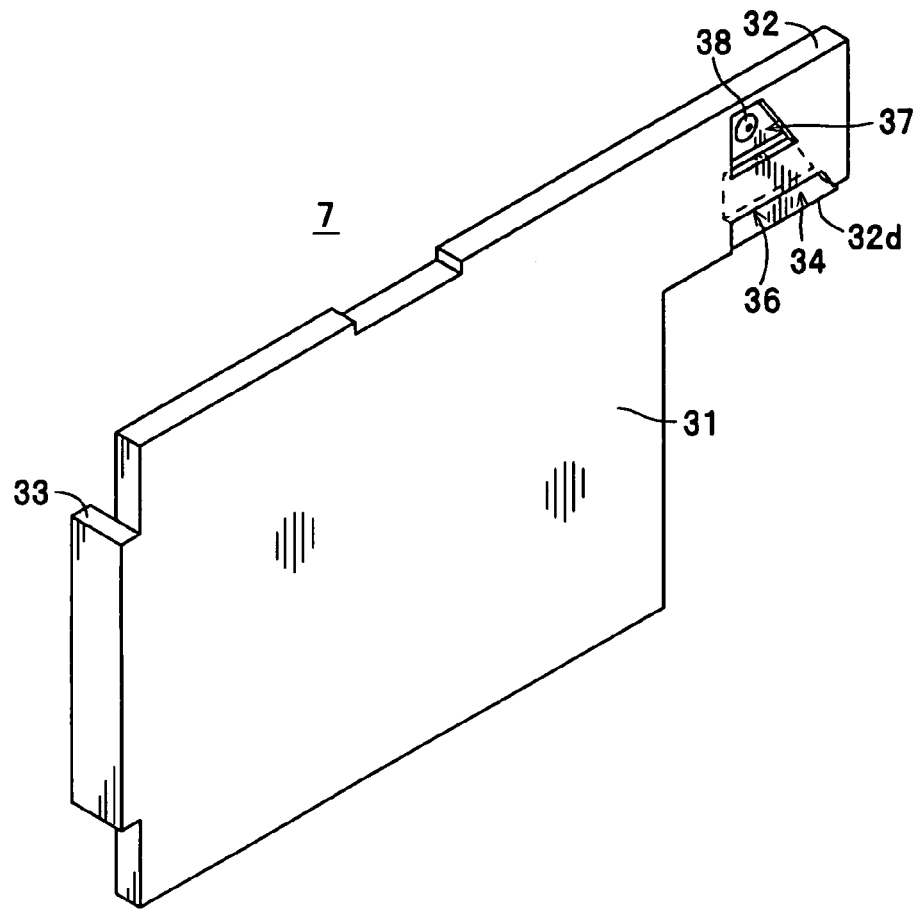
FIG. 5 is a perspective view of the door member as viewed from a side opposite to the side of FIG. 2.

On the other hand, as shown in FIG. 4, a wall 32b on one-surface side (right-surface side as viewed in FIG. 4) and the wall 32c on the other-surface side (left-surface side as viewed in FIG. 4) of the spring-mounting portion 32, which define the insertion hole 34, are formed in parallel with each other. Further, the opposed surfaces of the walls 32b and 32c (a pair of inner surfaces 34c and 34d toward the opening of the insertion hole 34) are formed in parallel with each other, and the distance L between the inner surfaces 34c and 34d is slightly larger than the thickness of a wire forming the spring member 8. Further, portions (regions B1 and B3) of the wall 32b of the insertion hole 34, which face the opening-side region A1 and the innermost region A3 of the insertion hole 34, respectively, are not cut out, but only a portion (region B2) of the same, which faces the intermediate region A2, is cut out such that the formed cutout communicates with the insertion hole 34. On the other hand, a portion (region C2) of the wall 32c of the insertion hole 34, which faces the intermediate region A2, is not cut out, but only portions (regions C1 and C3) of the same, which face the opening-side region A1 and the innermost region A3, respectively, are cut out such that the formed cutouts communicate with the insertion hole 34. Therefore, the wall 32b is formed with a hole 35 communicating with the insertion hole 34, as shown in FIGS. 2 to 4, and the wall 32c is formed with a cutout 36 in its region C1 facing the opening-side region A1, as shown in FIGS. 4 and 5, and a hole 37 in its region C3 facing the innermost region A3, such that the hole 37 communicates with the insertion hole 34. That is, the spring-mounting portion 32 has the cutout 36 and the holes 35 and 37, formed alternately in the walls 32b and 32c defining the insertion hole 34 from the opening-side region A1 to the innermost region A3. Further, the inner surface of the region B3 of the wall 32b facing the innermost region A3 is formed with a protuberance 38 circular in plan view.

As shown in FIG. 1, the spring member 8 is implemented by a torsion coil spring (torsion spring) having coil portions 8a and 8a, and a foremost end 8b at a left end as viewed in FIG. 1 is brought into a stopper, not shown, within the guide groove 18a, and a foremost end 8c at a right end as viewed in FIG. 1 is mounted in the spring-mounting portion 32 of the door member 7, thereby urging the door member 7 toward the closed position. The foremost end 8c of the spring member 8 corresponds to the foremost end of the spring member in the present invention, and turned over substantially in the same plane that the coil portions 8a and 8a are in, to form a P shape as shown in FIG. 6.

Next, a description will be given of the method of mounting the spring member 8 on the door member 7.

Figure 6:
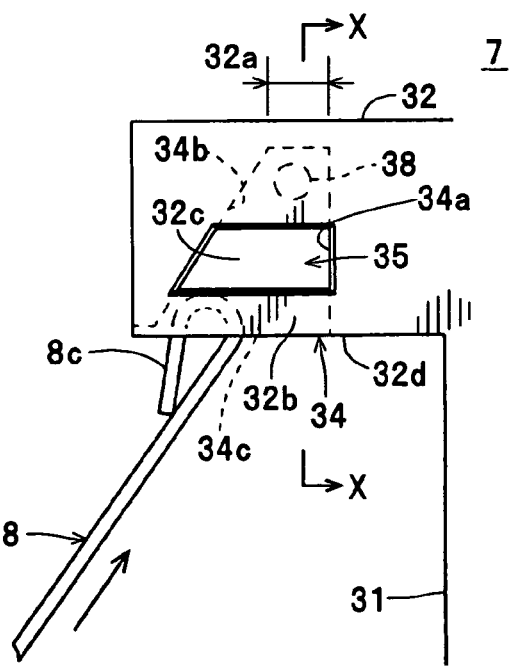
FIG. 6 is an enlarged fragmentary front view of the spring-mounting portion, which is useful in explaining the method of mounting the spring member on the door member.
Figure 7:
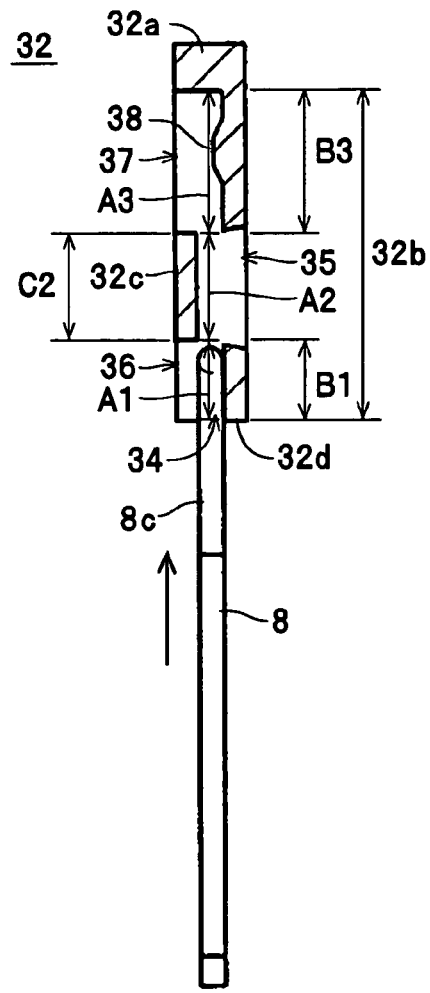
FIG. 7 is a cross-sectional view of the spring-mounting portion taken on line of X—X in FIG. 6.
Figure 8:
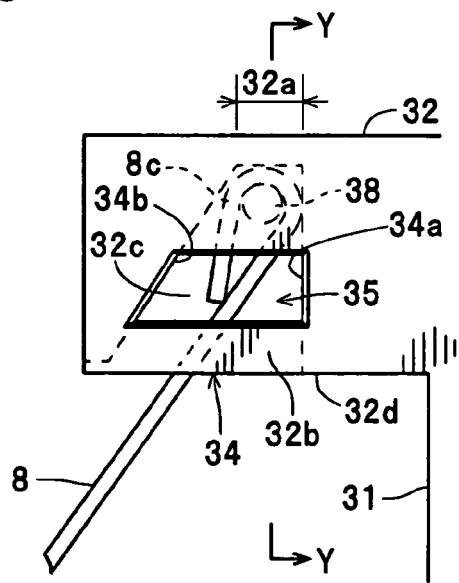
FIG. 8 is an enlarged fragmentary cross-sectional view of the spring-mounting portion on which the spring member has been mounted.
Figure 9:
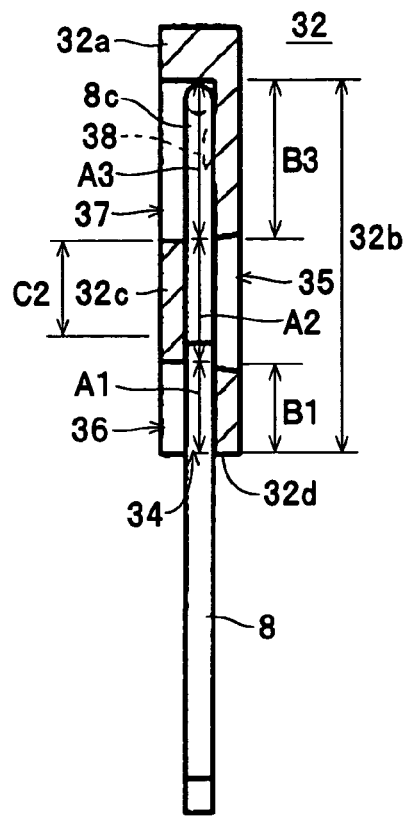
FIG. 9 is a cross-sectional view of the spring-mounting portion taken on line of Y—Y in FIG. 8.

First, as shown in FIGS. 6 and 7, the foremost end 8c of the spring member 8 is caused to extend along the inner surface (inner surface facing the opening-side region A1) of the wall 32b of the spring-mounting portion 32, and then the foremost end 8c is moved toward the innermost end of the insertion hole 34, as shown in FIGS. 8 and 9, until it reaches a position where it is brought into abutment with the wall 32a. At this time, at least one of the foremost end 8c of the spring member 8 turned over into the P shape and the protuberance 38 undergoes resilient deformation, whereby the protuberance 38 enters the foremost end 8c, causing the foremost end 8c and the protuberance 38 to be engaged with each other. This completes mounting (provisional fixing) of the foremost end 8c of the spring member 8 to the spring-mounting portion 32. When the mounting is completed, the foremost end 8c of the spring member 8 and the protuberance 38 are engaged with each other, so that the connected state of the door member 7 and the spring member 8 is maintained.

Figure 10:
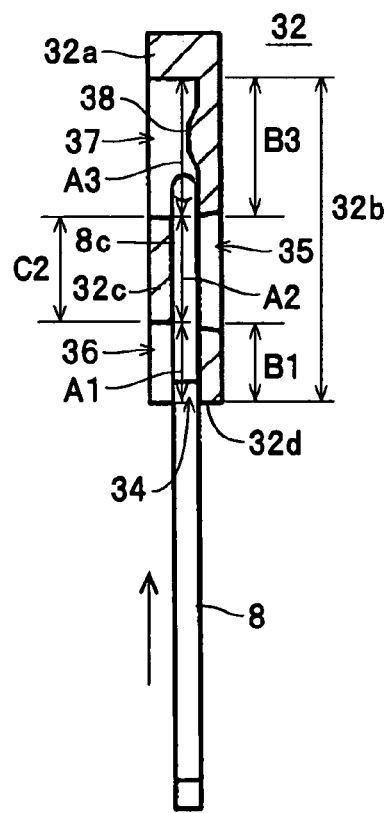
FIG. 10 is a cross-sectional view of the spring-mounting portion in a state where the foremost end of the spring member has reached an innermost part of a wall, taken on a straight line perpendicularly extending through a protuberance formed on the part.

When the foremost end 8c of the spring member 8 is inserted into the insertion hole 34, since the distance between the inner wall surfaces 34a and 34b is progressively reduced toward the innermost end (wall 32a) of the insertion hole 34, the foremost end 8c of the spring member 8 is reliably guided into the innermost end of the insertion hole 34 along the inner wall surfaces 34a and 34b. Further, when the foremost end 8c is about to be engaged with the protuberance 38, an urging force is applied to the foremost end 8c by the protuberance 38 in the direction of the hole 37 of the wall 32c. However, the foremost end 8c of the spring member 8 is supported, as shown in FIG. 10, by the three points, i.e. the regions B1 and B3 of the wall 32b and the region C2 of the wall 32c, so that it maintains a straightforward position without being bent. This causes the spring member 8 to move within the insertion hole 34 without the foremost end 8c protruding from the hole 37. Therefore, the foremost end 8c is reliably engaged with the protuberance 38 only by inserting the spring member 8 into the insertion hole 34 without consciously causing the foremost end 8c to move toward the protuberance 38.

Further, even after the spring member 8 is mounted on the door member 7, as shown in FIG. 9, the foremost end 8c formed to have the P shape is supported (sandwiched) by the three points, i.e. the regions B1 and B3 of the wall 32b and the region C2 of the wall 32c. This maintains the spring member 8 in position between the same planes between which the door member 7 extends. Therefore, the spring member 8 is received into the space formed by the guide groove 18b of the upper casing 11 and the guide groove 18a of the lower casing 12, together with the door member 7, and even during elongation and contraction of the spring member 8 occurring according to the opening and closing of the door member 7, the spring member is mainly deformed between the same planes between which the door member 7 extends. Therefore, friction between the spring member 8 and the inner surfaces of the side boards 15b and 13b and the partition wall 17a and so forth, defining the guide groove 18a and 18b, is reduced so that the sliding of the door member 7 is smoothly performed.

As described above, according to this door member 7, the spring-mounting portion 32 is configured as summarized as follows: Cutouts are alternately formed in the walls 32b and 32c defining the insertion hole 34 from the opening-side region A1 to the innermost region A3 thereof, such that the cutouts communicate with the insertion hole 34, more specifically, the region B2 of the wall 32b facing the intermediate region A2 is cut out such that the formed cutout (hole) communicates with the insertion hole 34, and the regions C1 and C3 of the wall 32c facing the opening-side region A1 and the innermost region A3 are cut out such that the formed cutouts (hole and cutout) communicate with the insertion hole 34. Further, the protuberance 38 is formed on the inner surface of the wall 32b facing the innermost region A3, for engagement with the foremost end 8c of the spring member 8. Therefore, when the foremost end 8c of the spring member is inserted into the insertion hole 34 for engagement with the protuberance 38, even if the protuberance 38 applies the urging force to the foremost end 8c, which is about to climb over the protuberance 38, in the direction of the hole 37 of the wall 32c, it is possible to prevent the foremost end 8c from protruding from the hole 37 since the foremost end 8c is supported (sandwiched) by the three points, i.e. the regions B1 and B3 of the wall 32b and the region C3 of the wall 32c. As a result, it is possible to reliably and easily move the foremost end 8c of the spring member 8 within the insertion hole 34 to the protuberance 38 in the innermost end of the insertion hole 34. Therefore, it is possible to automate the operation of mounting the spring member 8 in the door member 7. Further, in forming the protuberance 38 for engagement with the foremost end 8c of the spring member 8 in the inner surface of the innermost region A3 of the wall 32b, the region C2 facing the innermost region A3 is cut out such that the formed cutout (hole) communicates with the insertion hole 34, so that it is possible to mold the cartridge with resin only using a pair of upper and lower molds.

Further, the inner wall surface 34a of the insertion hole 34 on the side of the door body 31 and the inner wall surface 34b opposed to the inner wall surface 34a are formed such that the distance therebetween is reduced toward the innermost end of the insertion hole 34. This makes it possible to smoothly and reliably guide the foremost end 8c of the spring member 8 along the inner wall surfaces 34a and 34b when the foremost end 8c of the spring member 8 is inserted into the insertion hole 34. Therefore, the foremost end 8c is reliably engaged with the protuberance 38 only by inserting the spring member 8 into the insertion hole 34 without consciously causing the foremost end 8c to move toward the protuberance 38. This makes it possible to automate the operation of mounting the spring member 8 on the door member 7 during manufacturing of the tape cartridge 1. Therefore, it is possible to sufficiently reduce the manufacturing costs of the tape cartridge 1.

Further, since the insertion hole 34 is formed as a bottomed hole, the upper wall 32a of the insertion hole 34 can be caused to serve as the restriction wall that prevents the foremost end 8c of the spring member 8 from protruding out of the spring-mounting portion 32. Therefore, even when the amount of insertion of the spring member 8 into the insertion hole 34 is a little too large, it is possible to cause the foremost end 8c of the spring member 8 to be engaged with the protuberance 38 while reliably preventing foremost end 8c from protruding (coming off) from the spring-mounting portion 32. As a result, it is possible to simplify the control of motion of the spring member 8 in automating the operation of mounting the spring member 8 on the door member 7. Therefore, it is possible to sufficiently reduce the costs of automatic machines for manufacturing tape cartridges 1. As a result, the manufacturing costs of tape cartridges 1 can be further reduced.

The present invention is by no means limited to the preferred embodiment described above, but it can be modified as desired. Although in the above-described embodiment, the description has been given of the example in which the wall 32a as one of the walls defining the insertion hole 34 is formed as the restriction wall for preventing the foremost end 8c of the spring member 8 from protruding from the spring-mounting portion 32, this is not limitative, but the distance between the inner wall surfaces 34a and 34b facing the innermost region A3 of the insertion hole 34 may be made smaller than the diameter of bend of the foremost end 8c, whereby the foremost end 8c can be prevented from protruding. In this case, the portions forming the inner wall surfaces 34a and 34b of the spring-mounting portion 32 function as the restriction wall.

What is claimed is:

1. A door member for a tape cartridge, said door member configured to close a tape outlet provided in said tape cartridge such that said tape outlet is openable, said door member comprising:
    a door body configured as a flat plate; and
    a spring-mounting portion configured as a flat plate, said spring-mounting portion extending from said door body and having one end face having an insertion hole provided therein in which a foremost end of a spring member is inserted, one surface-side wall and another surface-side wall defining said insertion hole from an opening-side region of said insertion hole toward said end face to an innermost region of the insertion hole, cutouts being alternately provided in said one surface-side wall and said other surface-side wall, such that said cutouts communicate with said insertion hole, said spring-mounting portion having a protuberance provided on an inner surface of said one surface-side wall facing said innermost region, for engagement with said foremost end of said spring member,
    wherein an inner wall surface of said insertion hole on a door body side and another inner wall surface opposed to said inner wall surface are configured such that a distance between said inner wall surfaces is reduced toward an innermost end of said insertion hole.

2. A door member as claimed in claim 1, wherein said cutouts are configured by a removed portion of said one surface-side wall facing an intermediate region of said insertion hole between said opening-side region toward said end face and said innermost region, such that said cutouts communicate with said insertion hole, and respective removed portions of said other surface-side wall facing said opening-side region and said innermost region of said insertion hole, such that said cutouts communicate with said insertion hole.

3. A door member according to claim 2, wherein said spring-mounting portion includes a restriction portion that prevents said foremost end of said spring member inserted into said insertion hole from protruding from said spring-mounting portion.

4. A door member according to claim 3, wherein said restriction portion is a restriction wall with which said foremost end of said spring member is brought into abutment, whereby said foremost end of said spring member is prevented from protruding from said spring-mounting portion.

5. A door member according to claim 1, wherein said spring-mounting portion includes a restriction portion that prevents said foremost end of said spring member inserted into said insertion hole from protruding from said spring-mounting portion.

6. A door member according to claim 5, wherein said restriction portion is a restriction wall with which said foremost end of said spring member is brought into abutment, whereby said foremost end of said spring member is prevented from protruding from said spring-mounting portion.

7. A door member for a tape cartridge, said door member configured to close a tape outlet provided in said tape cartridge such that said tape outlet is openable, said door member comprising:
    a door body configured as a flat plate; and
    a spring-mounting portion configured as a flat plate, said spring-mounting portion extending from said door body and having one end face having an insertion hole provided therein in which a foremost end of a spring member is inserted, one surface-side wall and another surface-side wall defining said insertion hole from an opening-side region of said insertion hole toward said end face to an innermost region of the insertion hole, cutouts being alternately provided in said one surface-side wall and said other surface-side wall, such that said cutouts communicate with said insertion hole, said spring-mounting portion having a protuberance provided on an inner surface of said one surface-side wall facing said innermost region, for engagement with said foremost end of said spring member,
    wherein said cutouts are configured by a removed portion of said one surface-side wall facing an intermediate region of said insertion hole between said opening-side region toward said end face and said innermost region, such that said cutouts communicate with said insertion hole, and respective removed portions of said other surface-side wall facing said opening-side region and said innermost region of said insertion hole, such that said cutouts communicate with said insertion hole,
    wherein an inner wall surface of said insertion hole on a door body side and another inner wall surface opposed to said inner wall surface are configured such that a distance between said inner wall surfaces is reduced toward an innermost end of said insertion hole.

8. A door member according to claim 7, wherein said spring-mounting portion includes a restriction portion that prevents said foremost end of said spring member inserted into said insertion hole from protruding from said spring-mounting portion.

9. A door member according to claim 8, wherein said restriction portion is a restriction wall with which said foremost end of said spring member is brought into abutment, whereby said foremost end of said spring member is prevented from protruding from said spring-mounting portion.

10. A tape cartridge accommodating a single reel of magnetic tape, comprising:
    a casing body comprising an upper casing and a lower casing configured to be fitted to each other, said casing body having a side wall provided with a tape outlet from which said magnetic tape can be pulled from;
    a door member attached to said casing body such that said door member is slidable along said side wall, said door member closing said tape outlet such that said tape outlet is openable; and
    a spring member urging said door member toward a closed position in which said tape outlet is closed,
    said door member comprising a door body configured as a flat plate, and a spring-mounting portion configured as a flat plate, said spring-mounting portion extending from said door body and having one end face having an insertion hole provided therein in which a foremost end of the spring member is inserted, one surface-side wall and another surface-side wall defining said insertion hole from an opening-side region of said insertion hole toward said end face to an innermost region of said insertion hole, cutouts being alternately provided in said one surface-side wall and said other surface-side wall, such that said cutouts communicate with said insertion hole, said spring-mounting portion having a protuberance provided on an inner surface of said one surface-side wall facing said innermost region, for engagement with said foremost end of said spring member, wherein an inner wall surface of said insertion hole on a door body side and another inner wall surface opposed to said inner wall surface are configured such that a distance between said inner wall surfaces is reduced toward an innermost end of said insertion hole.

11. A tape cartridge according to claim 10, wherein said cutouts are configured by a removed portion of said one surface-side wall facing an intermediate region of said insertion hole between said opening-side region toward said end face and said innermost region, such that said cutouts communicate with said insertion hole, and respective removed portions of said other surface-side wall facing said opening-side region and said innermost region of said insertion hole, such that said cutouts communicate with said insertion hole.

12. A door member according to claim 10, wherein said spring-mounting portion includes a restriction portion that prevents said foremost end of said spring member inserted into said insertion hole from protruding from said spring-mounting portion.

13. A door member according to claim 12, wherein said restriction portion is a restriction wall with which said foremost end of said spring member is brought into abutment, whereby said foremost end of said spring member is prevented from protruding from said spring-mounting portion.

* * * * *